United States Patent
Phelan et al.

(10) Patent No.: US 10,367,731 B2
(45) Date of Patent: Jul. 30, 2019

(54) METHOD AND APPARATUS FOR ROUTING VOICE CALLS OVER VOICE OVER INTERNET PROTOCOL NETWORKS

(71) Applicant: Unified Office, Inc., Portsmouth, NH (US)

(72) Inventors: Thomas R. Phelan, Hopkinton, MA (US); Raymond Pasquale, Milford, NH (US)

(73) Assignee: Unified Office, Inc., Nashua, NH (US)

( * ) Notice: Subject to any disclaimer, the term of this patent is extended or adjusted under 35 U.S.C. 154(b) by 118 days.

(21) Appl. No.: 15/067,648

(22) Filed: Mar. 11, 2016

(65) Prior Publication Data

US 2017/0264539 A1 Sep. 14, 2017

(51) Int. Cl.
| | |
|---|---|
| H04L 12/26 | (2006.01) |
| H04L 12/721 | (2013.01) |
| H04M 7/00 | (2006.01) |
| H04L 29/08 | (2006.01) |
| H04L 12/24 | (2006.01) |
| H04L 29/06 | (2006.01) |
| H04M 3/22 | (2006.01) |

(52) U.S. Cl.
CPC .......... *H04L 45/70* (2013.01); *H04L 41/5035* (2013.01); *H04L 41/5087* (2013.01); *H04L 43/08* (2013.01); *H04L 43/0829* (2013.01); *H04L 43/0864* (2013.01); *H04L 65/1053* (2013.01); *H04L 65/80* (2013.01); *H04L 67/10* (2013.01); *H04M 7/006* (2013.01); *H04M 7/009* (2013.01); *H04L 43/087* (2013.01); *H04L 43/0852* (2013.01); *H04M 3/2236* (2013.01)

(58) Field of Classification Search
CPC . H04L 43/0829; H04L 43/0864; H04L 45/70; H04M 7/006; H04M 7/009
See application file for complete search history.

(56) References Cited

U.S. PATENT DOCUMENTS

| | | | |
|---|---|---|---|
| 7,466,694 B2 * | 12/2008 | Xu | H04L 45/10 370/236 |
| 7,529,225 B2 * | 5/2009 | Joseph | H04L 12/2856 370/352 |
| 7,945,656 B1 * | 5/2011 | Remaker | H04L 29/12028 370/289 |
| 2005/0249157 A1 | 11/2005 | Qian | |
| 2014/0204954 A1 | 7/2014 | Nee | |
| 2014/0223427 A1 | 8/2014 | Bootland | |

* cited by examiner

*Primary Examiner* — Mansour Oveissi
(74) *Attorney, Agent, or Firm* — Sheehan Phinney Bass & Green PA (57) ABSTRACT

A method is provided for improving voice quality of Voice over IP networks in which a highest-quality routing protocol is interposed between a local IP PBX exchange and a cloud-based Internet service provider server to which calls are to be routed, wherein the highest-quality routing protocol detects the quality of the voice channel between the local IP PBX exchange and cloud-based Internet service provider servers and routes voice calls to that cloud-based Internet service provider server exhibiting the highest voice call quality, with the highest voice quality server connection determined by detecting lost packets and packet delay between the local IP PBX exchange and a server.

25 Claims, 5 Drawing Sheets

1) Route to multiple pairing partitions

2) Geographic diversity

3) Implement HQRP protocol to select best switch in the network

*Fig. 7*

METHOD AND APPARATUS FOR ROUTING VOICE CALLS OVER VOICE OVER INTERNET PROTOCOL NETWORKS

FIELD OF INVENTION

This invention relates to the routing of VoIP calls and more particularly to a call routing system that probes a number of VoIP servers at disparate geographic locations, detects the quality of the connection and chooses the connection which minimizes packet loss, delay and jitter to provide high quality voice communications.

BACKGROUND OF THE INVENTION

Medium and even small size enterprises which rely on inbound voice calls have in the past relied on landline techniques and PBX exchanges at the premises in order to handle the incoming calls. Not only are PBX exchanges costly, the PBX technology is presently outdated and does not support many of the functions that are required for the taking of the inbound calls. Not only are the landlines expensive, the landline tariff structure for calls to various area codes oftentimes requires long-distance packages which are cost prohibitive. Establishments such as pizza delivery services, restaurants, automobile dealerships, auto service centers, real estate offices and the like require personnel to take incoming calls on multiple lines into the establishment. It was thought that many of the cost problems associated with landlines could be solved using Voice over Internet Protocol, VoIP, systems.

The problem with many Voice over IP networks is the maintenance of quality voice communications when trying to route voice calls through an Internet protocol network due to the constant change in the quality of the connections as a result of network condition changes. Changes in communication channel conditions can result in packet loss, delay and jitter which ultimately affect the audio quality of the voice communication. In VoIP systems audio is converted from an analog form to digital packets which are transmitted over the VoIP network at which point they are transformed back into analog audio.

While VoIP systems regularly route calls through the networks based on available bandwidth, network overload is a problem in which packets are dropped after first having been delayed. The net result for the end-user is that voice quality degrades. The voice degradation ranges from undetectable to non-understandable.

These problems occur most severely in over-the-top service where there is no direct link to the public switched telephone network, PSTN. Because of the lack of dedicated links such as provided by major carriers including Comcast and other Multiple System Operators, MSOs, that have a dedicated quality of service in which customers are directly linked to the public switched telephone network, when Internet service providers are used as an intermediary to connect between the individual placing the call and the ultimate public switched telephone network, there have been complaints about the quality of connections that the Internet service provider provides. The Internet service providers referred to herein are cloud-based providers and the audio quality complained of is directly traceable to connections to the Internet service providers and how they, as an intermediary, connect the caller to the telephone network. These ISPs have not heretofore addressed packet loss, delay and jitter. Rather these ISPs are concerned with bandwidth and rely on codec compression techniques to achieve the lowest amount of bandwidth that one can possibly use for voice call. However, achieving the lowest bandwidth involves compression which itself degrades voice quality.

To the extent that VoIP providers seek to address voice quality at all, prior VoIP providers contract with the high quality data centers. By so doing they hope that the call path stays at a high quality. However, utilizing high-quality data centers is insufficient to address the aforementioned audio fidelity and connection problems.

There is therefore need to be able to route the calls to those servers having the least packet loss, delay or jitter and to do so in a robust fashion when using multiple servers in multiple data centers, so as to route the calls over the most robust channel.

SUMMARY OF THE INVENTION

The subject invention involves a hybrid cloud architecture with handouts to multiple service providers based on a unique Highest Quality Routing Protocol, HQRP, for selecting the best error-free voice channel. The use of multiple Internet service providers with the subject HQRP protocol in the middle permits selecting the best of the multiple ISPs as the termination carrier for a given call. In the process, the quality of the proposed path for the voice call is measured at the client side, meaning at a premise-based local exchange module, in which the premise-based local exchange module is connected to a switch layer interposed between the premise layer and the VoIP servers. In one embodiment, call path conditions are measured by sending a packet string every 20 to 40 seconds that is echoed back, with the number of packets lost and their delay measured. Also sent is a load request which measures the instantaneous load on the servers. The system then scores each of the call paths and compares scores of all the switches representing all the possible termination carriers to which one could connect a call. The voice call is then routed to that termination carrier having the best score, in this case, zero or as close to zero as possible. The score reflects packet loss and delays as well as load, with zero indicating no packet losses and a minimum acceptable delay as well as no untoward loading conditions.

In one embodiment, each time a path is scored, the system chooses as its primary path the path with the lowest (best) score. If multiple paths have the same lowest score, one is chosen randomly from those with the lowest score. The system then chooses a secondary path by choosing the path with the lowest score among the remaining paths. As with the primary path, ties are broken by choosing randomly among the paths with the same score.

When making calls, the call is routed through the primary path. If that path fails, the call is re-routed through the secondary path.

The key features of the hybrid cloud architecture are first being able to route to multiple pairing partners in the network to select which of the pairing partners are designated to hand the call to the PSTN. The second advantage is geographic diversity so as to spread out risk over a wide geographic area to eliminate effects of a localized outage or service problem. Thirdly, using a premise-based local exchange to implement the subject HQRP protocol permits selecting the best switch/termination carrier at the enterprise and the ability to multiplex many lines by connecting them to the local IP PBX for eliminating multiple trunks and for increasing reliability.

As distinguished from a two layer architecture in which one needs a session initiation protocol, SIP, trunk from each customer to a service provider with attendant per trunk cost, in the subject system by providing a middle layer one is able to aggregate a number of customers and use only one trunk between the middle layer and an ISP or termination carrier. Not only are the number of trunks and connections minimized with the subject system, by reducing the number of trunks one increases reliability.

The switches described herein are called session border controllers, or SBCs, that connect calls between domains of voice providers. They are called border switches because the switches lie on the border between the caller's domain and the domains of other companies that are providing VoIP service.

In one embodiment, equipment at the customer premise chooses a session border controller based on monitored conditions. The chosen session border controller then switches the call to one of the VoIP termination carrier data centers around the country. The VoIP termination carrier to which the call is routed in turn connects the call to a backbone carrier such as Level 3 or AT&T.

In short, probing from the customer premise establishes the overall call path quality between the premise-based equipment and the servers. Call path quality is measured by packet checking followed by routing at a premise-based local exchange into which the subject HQRP protocol has been installed. As will be seen, the routing is in the intelligence provided at the customer site by the updated local exchange which determines the call routing.

Note that the polling from the premise-based modified local exchange never stops and operates in the background. After each measurement new primary and secondary routes are calculated. It will be noted in the subject system once a voice call has been routed, then the connection is maintained for the duration of the call.

The net result is that the subject system provides high quality voice over time. This operates regardless of the fact that the network quality may change. Most of the time, the majority of the networks are operating satisfactorily. However, every now and again a problem exists in the call path, with the problem being localized. By having a system that switches to different data centers and different providers across the country, one can select a path that avoids the problem. If the quality goes down during a particular voice call, there is nothing that the system does to correct the routing. However, the system adapts for new calls. Since a call is roughly 3 minutes on average, the likelihood that the selected call path, once selected, will go down or become corrupted is remote.

The ability to select an appropriate call path depends on the aforementioned scoring system which assesses various parameters such as packet loss, delay and jitter. In one embodiment, the score is derived by determining if lost packets are greater than cumulative lost packets and there are a number of steps in the determination of the score. It is noted that prior VoIP systems do not decide to route calls based on the current network quality, but rather route calls based on instantaneous server load level. Thus, in the past, the call was routed to the least loaded server.

In one embodiment, the subject scoring system uses the following parameters: lost packets, the number of packets from the probe burst that were not received, the maximum round trip time (RTT) experienced by the probe packets, load level and the most recently received load level. Scoring also uses parameters from recent measurement history such as: cumulative lost packets, the history of lost packets that increases with lost packets and slowly decays during periods of no packet loss, cumulative max RTT, and a maximum recently seen round-trip time that decays as low maximum round trip times are seen.

The subject scoring algorithm is described in the following pseudocode which adds hysteresis to the measurements: if lost packets are greater than cumulative lost packets, set the cumulative lost packets to lost packets. If lost packets are zero, decrement cumulative lost packets to not go below zero. If cumulative lost packets are zero, set the score to zero, otherwise set the score to floor cumulative lost packets divided by a constant referring to the packet loss scoring step size, such as 5. By "floor" is meant the lowest associated integer. If max RTT is greater than cumulative max RTT, subtract score RTT step from cumulative max RTT, but not below zero. If max RTT is greater than cumulative max RTT, set cumulative max RTT equal to max RTT. Add floor cumulative max RTT score, divided by a constant, such as 0.1. If the load level is greater than switch load high, add a switch load high penalty to score. Moreover, if load level is greater than switch load level median, then add a switch load median penalty to score.

Experience shows looking at these networks and seeing what causes most problems, if for instance the packet loss rate was 50 packets, if one loses one of those packets the call path circuit probably is not terrible. If one loses 25 packets, one does not want to consider switching to this network. Moreover, if the round-trip time is less than 100 ms then this is satisfactory. However, if the round-trip time is around 200 to 400 ms, it doesn't matter how many packets are involved, if all packets go through with a round-trip time of greater than 200 ms, one does not want to select this route.

In summary, a method is provided for improving voice quality of Voice over IP networks in which a highest-quality routing protocol is interposed between a local IP PBX exchange and a cloud-based Internet service provider server to which calls are to be routed, wherein the highest-quality routing protocol detects the quality of the voice channel between the local IP PBX exchange and cloud-based Internet service provider servers and routes voice calls to that cloud-based Internet service provider server exhibiting the highest voice call quality, with the highest voice quality server connection determined by detecting lost packets and packet delay between the local IP PBX exchange and a server.

BRIEF DESCRIPTION OF THE DRAWINGS

These and other features of the subject invention will be better understood in connection with the Detailed Description in conjunction with the Drawings of which.

DETAILED DESCRIPTION

Prior to describing the subject invention and by way of further introduction, in the subject invention, a Highest Quality Routing Protocol (HQRP) utilizes Total Connect Now, TCN, updated IP PBX exchanges and switches to make dynamic decisions about outbound voice calls, i.e. TCNs-to-switches, and inbound voice calls i.e. PSTN trunk-to-switch-TCN call routing based on current and recent network conditions. The protocol determines the current "best" destination for a call and adjusts that determination as conditions change.

As will be discussed, the protocol works in three phases: an active measurement phase where network conditions are probed, a scoring phase where the results of the measurements are scored and a comparison phase where the best route is determined.

Figure 1:
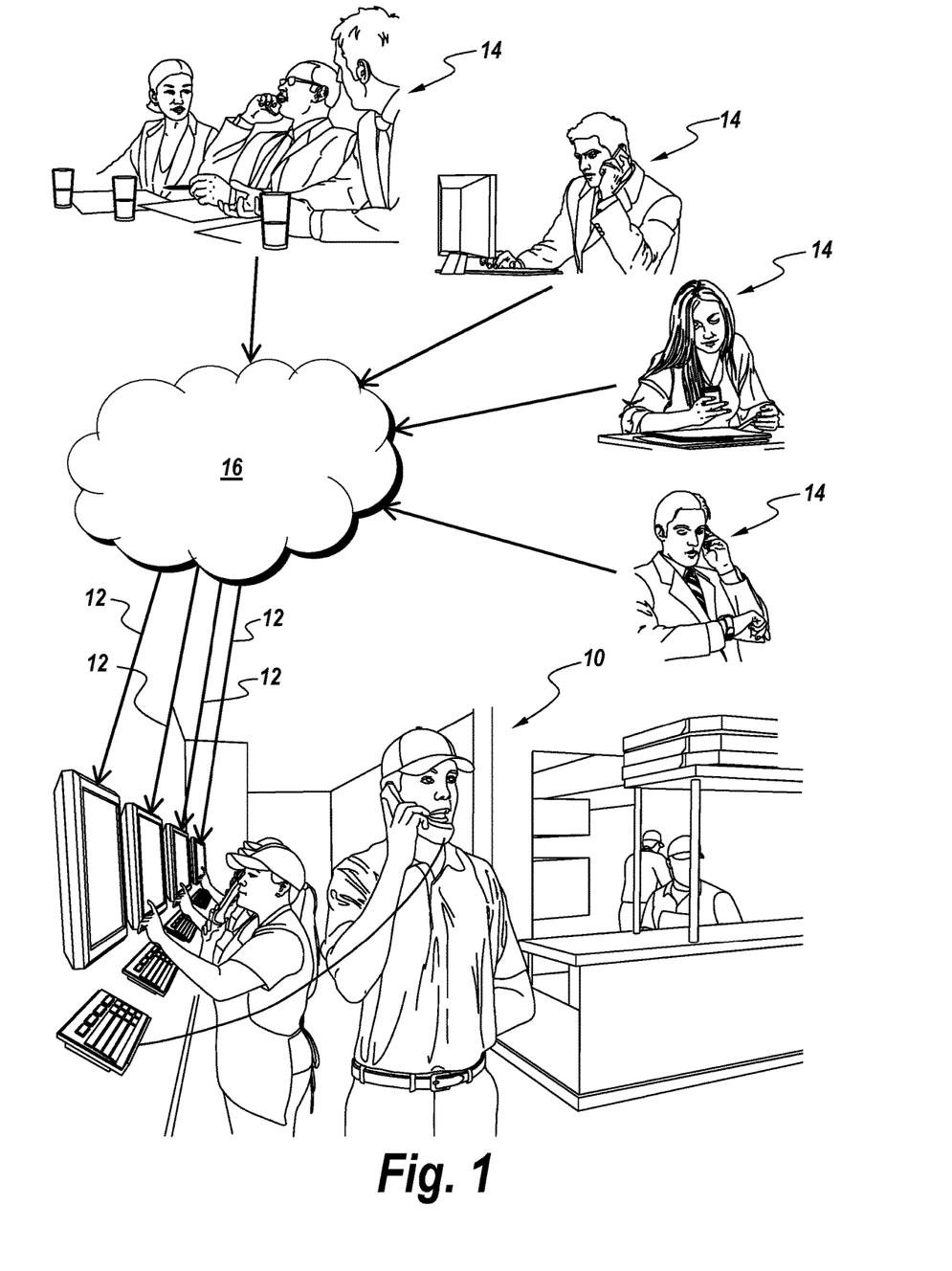
FIG. 1 is a diagrammatic illustration of an enterprise which is adapted to receive voice calls over a number of different lines utilizing a Voice over IP service.

Referring now to FIG. 1, what is shown is an enterprise 10 to which a number of voice call lines 12 couple voice calls from a number of different individuals 14 through TCP/IP networks carried in the cloud 16. It is important that the quality of these voice calls both from callers from outside the enterprise and voice calls from the enterprise to the incoming callers be of high quality. There is nothing which turns off the customer faster than not being able to communicate one's order to a call taker and then not to understand the call taker and furthermore not to be understood. Not only are dropped calls and the like counterproductive for an enterprise receiving inbound calls, there is more frustration than necessary when trying to understand an inbound caller or for the inbound caller not to be able to understand the call taker. It is for this reason that enterprises are not inclined to use VoIP services, despite the lower cost of some of these services versus dedicated landline systems.

Figure 2:
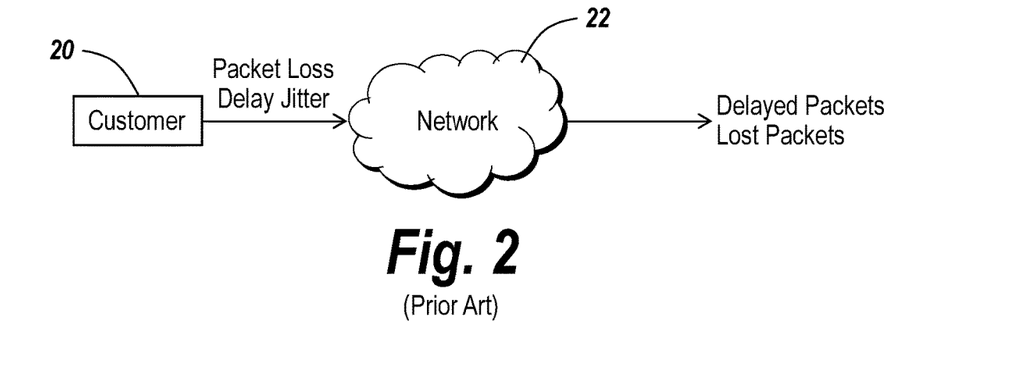
FIG. 2 is a diagrammatic illustration of a prior art VoIP network which suffers from packet loss, delay and jitter that results in the late packets, lost packets and in general a lack of audio quality.

Referring to FIG. 2, in prior art VoIP systems a customer 20 is connected to the cloud 22 at which VoIP servers reside which then connect a customer to an enterprise. Because of packet loss, delay or jitter, the net result is delayed packets and lost packets which contribute to lack of intelligibility of those voice calls that are in fact completed, to say nothing of the loss of a connection between the customer and the enterprise.

Figure 3:
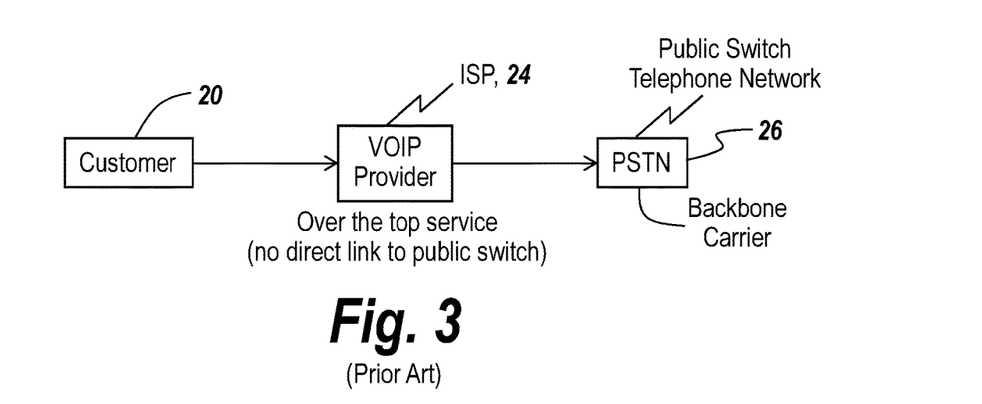
FIG. 3 is a diagrammatic illustration of a prior art over the top VoIP service provider interposed between the customer and a backbone carrier serving as a public switch telephone network.

Referring to FIG. 3, the situation is shown in which a customer 20 is connected to a VoIP provider 24, namely an Internet service provider connected to a public switched telephone network, PSTN, 26 that functions as a backbone carrier. Such carriers are in general MSOs. In FIG. 3, the use of VoIP servers is called over-the-top service, in which there is no direct link to the public switch.

Figure 4:
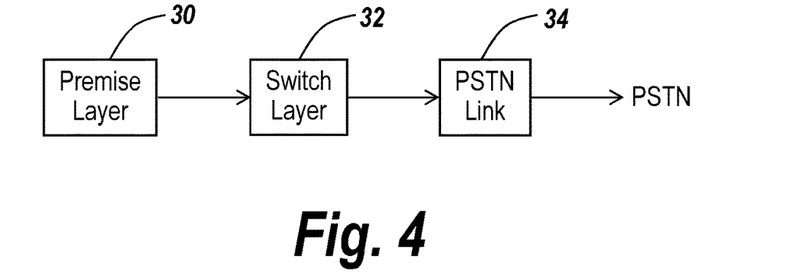
FIG. 4 is a diagrammatic illustration of the subject VoIP system in which a premise layer is coupled to a switch layer that is in turn coupled to a PSTN link, in which the premise layer includes a premise-based local exchange updated with the subject HQRP recall that is utilized in measuring call path quality and switching the voice call to a path which offers optimal reliability.

Referring to FIG. 4, in the subject system there is a premise layer 30 having telephone equipment within the enterprise which is connected to a switch layer 32 in the cloud that switches voice calls from the premise layer to various servers 34 that serve as PSTN links from the equipment at the premise to callers seeking to communicate with the enterprise.

Figure 5:
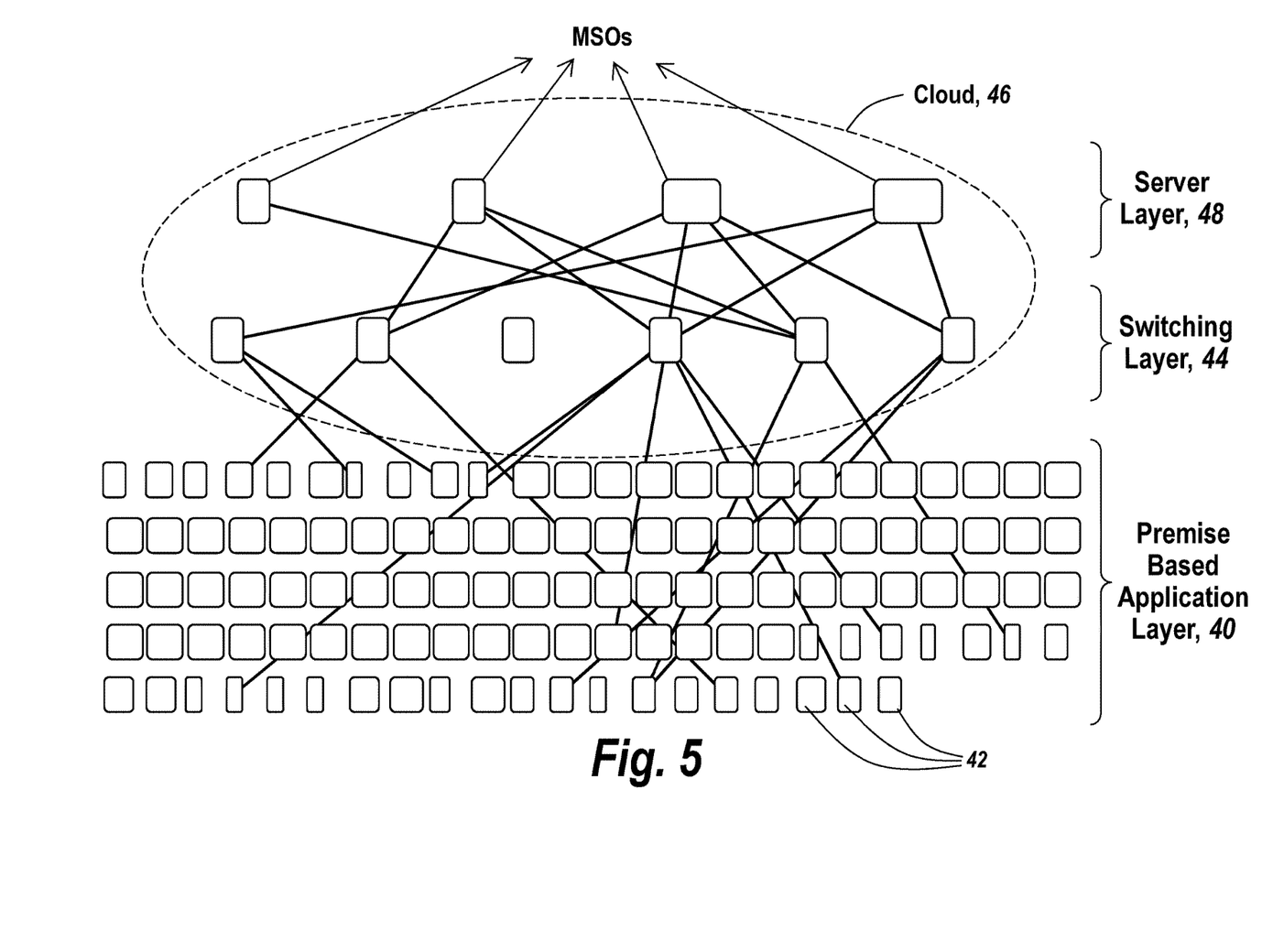
FIG. 5 is a system architecture diagram illustrating a premise-based application layer, switching layer and a server layer.

Referring to FIG. 5, from an architecture point of view, a premise-based application layer 40 having a number of individual telephones 42 is connected to a switching layer 44 in the cloud 46. The switching layer in turn is coupled to a server layer 48 in the cloud 46 in which the servers are owned by Internet service providers, in the subject case, VoIP service providers. When voice communication is coupled to a particular server, this server is connected to an MSO. It is the purpose of the subject invention to be able to organize calls from the application layer by switching calls to VoIP servers in the cloud that constitute the most robust connection.

As will be seen, this is accomplished by a premise-based IP PBX updated with the HQRP algorithm that is located at the enterprise and which interfaces all telephones at the enterprise with switches and VoIP servers in the cloud so that routing of voice calls can be accomplished utilizing the most reliable call path. How the most reliable call path is ascertained will be described hereinafter. What is important to remember is that in the subject system the routing system is based at the enterprise's premise and it is to this routing system that all telephones at the premise are coupled. The routing system includes a probing system to be able to measure the voice call quality between the premise and the cloud-based servers, with the probe being echoed back. In one embodiment, the probe is a packet string together with a load level probe that ascertains packet loss and delay as well as the load on a particular switch and thus the load on a particular VoIP server.

During the probing process not only is the load on a server ascertained, the quality of the call path between the enterprise and the switch is measured by measuring lost or delayed packets which are echoed back. The results of these two probing exercises are used to develop a score that is utilized to select to which VoIP server the calls are to be routed. In one embodiment, the lower the score, the lower the amount of lost packets and the lower the amount of delay such that the VoIP server having the lowest score is selected for the call. How this is accomplished is now described in FIG. 6.

Figure 6:
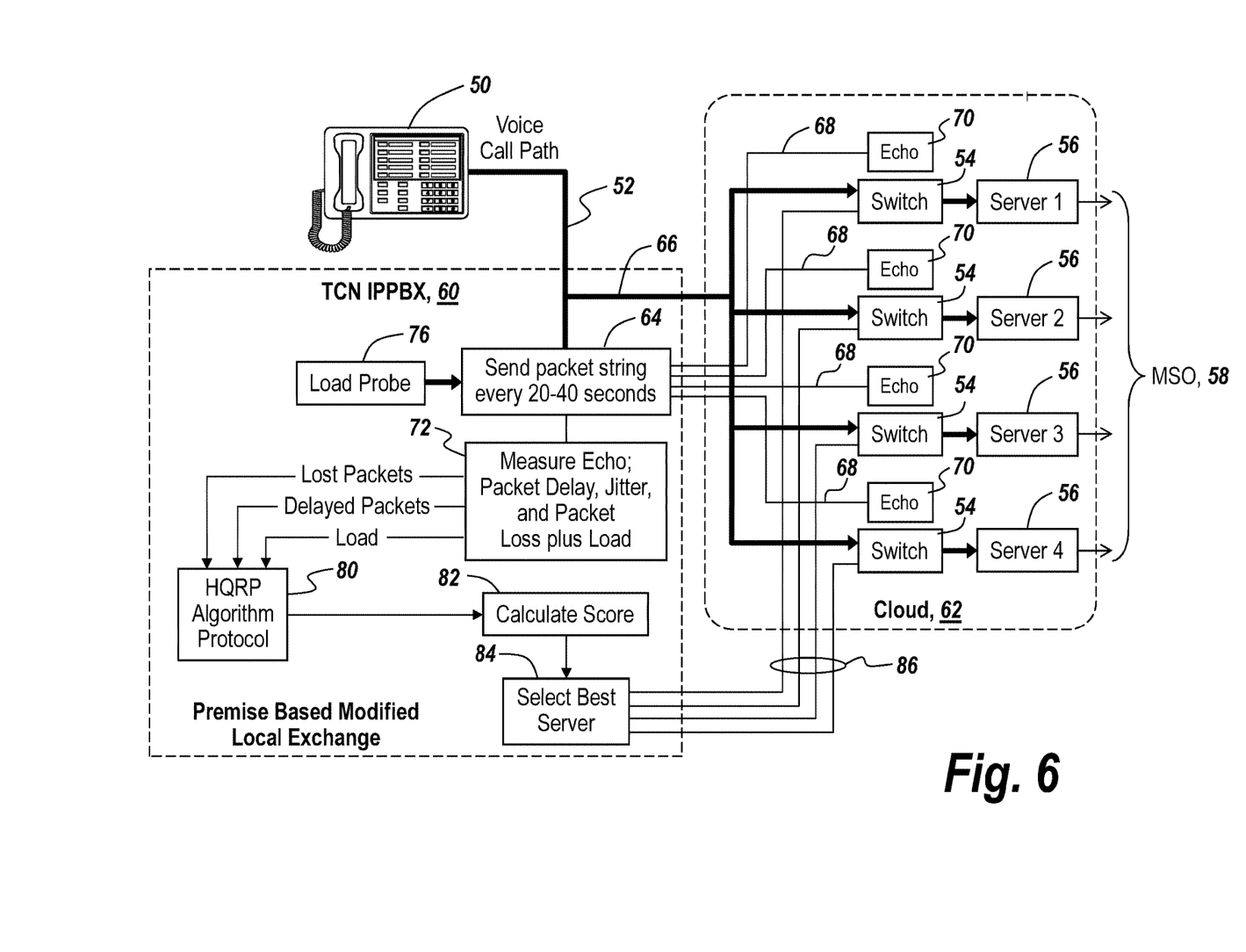
FIG. 6 is a diagrammatic illustration of an updated premise-based local exchange that functions to send out a packet string probe every 20 to 40 seconds and is and adapted to measure the echo in terms of packet delay, jitter and packet loss plus load, which measurements are utilized in an HQRP algorithm to calculate a score reflecting call path quality used to select the best server to which to route a voice call; and, FIG. 7 is a block diagram illustrating the interposition of the HQRP protocol between multiple ISPs in the cloud to route to multiple pairing partitions having geographic diversity in which the voice call is routed by selecting the best switch in the network.

Referring to FIG. 6, a telephone 50 is used for the receipt and transmission of calls along a call path 52 which is routed through switches 54 to a selected VoIP server 56 depending on the state of the switch. These switches are in general cloud-based session border controllers which are coupled to cloud-based servers. The servers themselves are connected to MSOs 58 for completion of a voice call between a caller and the particular enterprise involved.

All voice calls from phone 50 are routed through a premise-based local exchange 60 or TCN IP PBX updated with the HQRP software. The Total Connection Now PBX 60 at the enterprise serves to connect multiple phone lines through cloud 62 based VoIP servers to the MSOs. It will be appreciated that all of the routing intelligence is contained within the TCN IP PBX 60 such that by providing the enterprise with such a premise-based local exchange one can quickly adapt telephone service at an enterprise to connect to the best VoIP server.

It will be noted that the TCN IP PBX 60 has a function first to send a packet string every 20 to 40 seconds as illustrated at 64 over trunk line 66 to all of the VoIP server switches 54. These packet strings are diagrammatically illustrated as being transmitted over lines 68 to echo modules 70, one each associated with a server. Incoming packet strings are reflected back by echo modules 70 back to the TCN IP PBX 60 over trunk 66 at which point packet delay, jitter and packet loss are measured at 72. It is also a feature of TCN IP PBX 60 to transmit probes from a load level probe 76 to probe the load level on each of the servers and to report back the load level to measurement module 72. The probing of the voice call channel conditions by the packets from probe 64 can occur independently of the load level probe packets sent by load level probe 76. Regardless, the channel conditions and the load levels are transmitted back to the TCN IP PBX where the aforementioned measurements are made.

Having made these measurements, the results are applied to an HQRP algorithm 80 that is used to calculate a score as illustrated at 82 which is then utilized to select the best server as illustrated at 84 that results in activating a particular switch 54 having the best call path characteristics. The switches 54 are actuated from the output of the best server selection module 84 over lines 86. Note that the packet string probing can be done over a user datagram protocol, UDP which is one of the simplest communications models available. On the other hand, load level probing can be accomplished utilizing a specialized UDP packet sent to the switch load port, with a daemon listening to that port to read the incoming messages and respond to them.

What is now described in detail are the functional characteristics of the parts of the subject routing protocol.

TCN Configuration

Each TCN IP PBX 60 is assigned a pool of switches to use as possible candidates for outbound and inbound calls. The optimal size of this pool must be large enough to contain sufficient geographical and provider diversity to prevent "shared fate" events from disrupting all switches in the pool while also being small enough to prevent a significant load on the switches from the active measurements they receive.

Measurement Phase

The measurement phase includes active probing at 64 of the network conditions from the originating TCN 60 to each switch 54 in its pool and determining at load probe 76 the load level of each switch in its pool.

Network Probing

A node 64 probes the network conditions between itself and a routing candidate by periodically emitting a burst of echo packets. For TCNs, these echo packets are in the udpping.php format. The emitting node records the transmit time of each packet and then listens for returned packets and records the receive time of each packet received. After a suitable period of time, the node examines the returned packets and determines the maximum round trip time and the number of lost packets.

After determining the results from a burst, the node schedules a next burst at a randomly chosen time between the minimum and maximum burst times.

Switch Load Measurement

Periodically, TCN IP PBX 60 determines the current load level of its switches by sending a load request packet at 76 to each switch 54. Each switch runs a daemon that is a computer program that runs as a background process that responds to these packets by returning the current number of calls being served divided by a configured maximum calls value (times 100 to make it a percent load). After sending the load request packet to a switch, TCN IP PBX 60 schedules the next request at a randomly selected time between minimum and maximum load request times.

In one embodiment, the load request protocol employs the User Datagram Protocol, UDP, which uses a simple connectionless transmission model with a minimum of protocol mechanism that does not require a handshake. In so doing, requests and responses may be lost in the network. If a packet is lost, that measurement is effectively skipped and there are no retries.

Scoring Phase

After each measurement is complete, the current state of data for the upstream node is scored at 82. The scoring process uses the following parameters from the current measurements:

lostpkts—the number of packets from the burst that were not received.

maxrtt—the maximum round-trip-time experienced by received packets.

loadLevel—the most recently received load level

Scoring uses the following parameters from the recent history of measurements:

cumlostpkts—a history of lost packets that increases with lost packets and slowly decays during periods of no packet loss.

cummaxrtt—a maximum recently seen round trip time that decays as "low" maximum round trip times are seen.

Also, scoring uses configurable constant values shown in all caps in the pseudo-code.

The scoring algorithm process proceeds as in the following pseudo-code:

If lostpkts is greater than cumlostpkts, set cumlostpkts to lostpkts

If lostpkts is zero, decrement cumlostpkts (do not go below zero)

If cumlostpkts is zero set score to zero, else set score to floor(cumlostpkt/SCORELPKTSTEP)+1

If maxrtt is less than cummaxrtt, subtract SCORERTTSTEP from cummaxrtt (do not go below zero)

If maxrtt is greater than cummaxrtt, set cummaxrtt equal to maxrtt

Add floor(cummaxrtt/SCORERTTSTEP) to score

If loadLevel is greater than SWLOADHIGH add SWLOADHIGHPENALTY to score

Else if loadLevel is greater than SWLOADMED add SWLOADMEDPENALTY to score

Once a score has been computed, the process enters the comparison phase.

Comparison Phase

In the comparison phase, the scores from all the monitored targets are compared at 84 to determine primary and backup destinations for outbound calls. Simplistically, the primary is the target with the lowest score and the backup is the target with the second lowest score.

The comparison phase operates as in the following pseudo-code:

Create a selection list

Extract the targets with the lowest score

If the current primary target is in this group, select it as the primary

Else randomly select a primary from the group

Remove the selected primary target from the selection list

Extract the targets with the lowest score

If the current backup target is in this group, select it as the backup

Else randomly select a backup from the group

Inbound HQRP

Inbound HQRP allows TCNs to choose the switch that will receive inbound calls that are destined for it. Periodically (120 seconds+−20 seconds by default), TCNs running HQRP send their current primary switch choice to the inbound HQRP daemon (inhqrpd, running on tcn2.uotcn.net by default). When inhqrpd receives an update that has a different switch choice than the last update received (or if no previous update), it finds all Direct Inbound Dialing, DIDs, that belong to that TCN (using the 'ownertcn' column of the DirectInwardDialNumbers table) and then uses the Vitelity API to update routing for those numbers to the new switch.

Switch updates are not sent immediately after a change in chosen switch in order to reduce unnecessary fluctuations in the routing and to reduce the load on the Vitelity API.

Updates are sent via UDP and there is only one copy of inhqrpd running in the network. The effect of updates being lost is to freeze the routing at the current state until the next update. The effect of inhqrpd failing is to freeze the routing until inhqrpd can be restarted. Neither of these are serious failures since the network continues to operate, albeit perhaps sub optimally, during the failures.

Protocol Configuration Values

Figure 7:
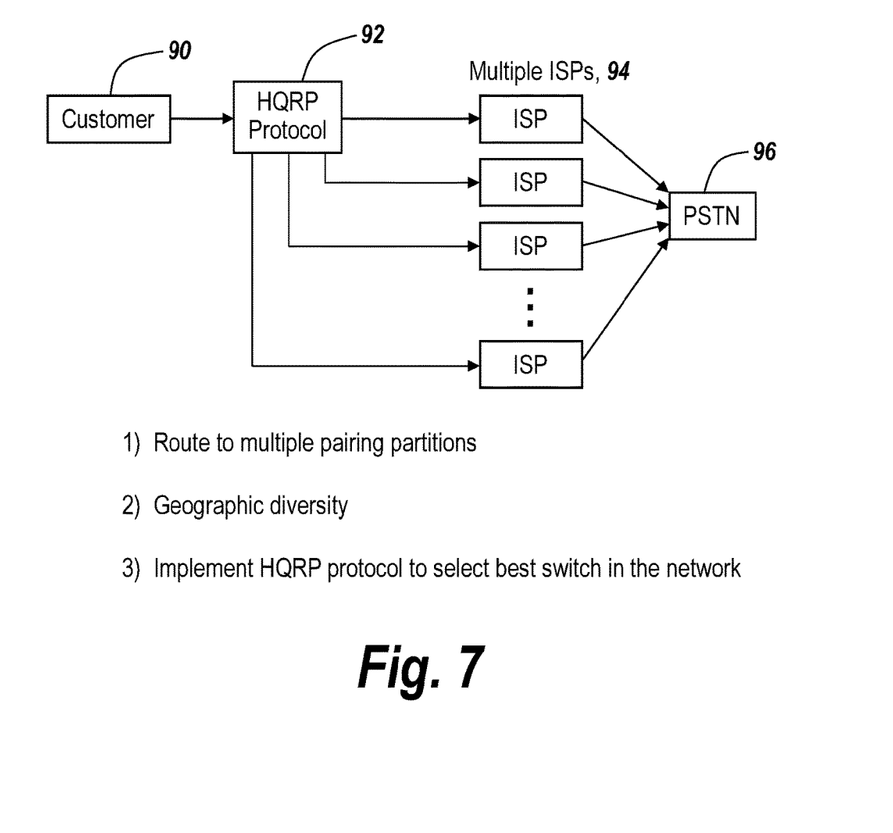

HQRP uses the following configurable values:
BURSTCHECKTIME (default 2): The time (in seconds) to accumulate receive packets after a burst is sent.
BURSTPORT (default 5080): The destination port for updping echo packets.
BURSTLENGTH (default 50): The number of packets in a burst.
BURSTTIMEMIN (default 20):
BURSTTIMEMAX (default 40): The minimum and maximum times (in seconds) between burst measurements.
SCORERTTSTEP (default 0.1): The round trip time scoring step time (in seconds).
SCORELPKTSTEP (default 5): The packet loss scoring step size (in packets).
SWLOADTIMEMIN (default 30):
SWLOADTIMEMAX (default 60): The minimum and maximum time between switch load requests (in seconds).
SWLOADHIGH (default 80): The switch load level considered "high" (in percent).
SWLOADHIGHPENALTY (default 50): The value to add to score when the load level is above SWLOADHIGH.
SWLOADMED (default 50): The switch load level considered "medium" (in percent).
SWLOADMEDPENALTY (default 10): The value to add to score when the load level is between SWLOADMED and SWLOADHIGH.
SWLOADPORT (default 5090): The destination port for load requests.
INHQRPPORT (default 5095): The destination port for the inbound HQRP server
INHQRPTARGET (default tcn2.uotcn.net): The host for the inbound HQRP server
INHQRPMINTIME (default 100): Minimum time (seconds) between inbound HQRP reports
INHQRPMAXTIME (default 140): Maximum time (seconds) between inbound HQRP reports In summary and referring to FIG. 7, the customer 90 is routed by the HQRP protocol 92 to multiple ISPs 94 which in turn couple a voice call from the customer to a PSTN 96. The purpose of the HQRP protocol is to provide robust voice calls through multiple pairing at partitions, to provide geographic diversity and to implement the HQRP protocol to select the best switch and network.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for connecting Voice over Internet Protocol (IP) calls, the system comprising:
   one or more premise-based telephones;
   a local premise-based IP private branch exchange (PBX) exchange coupled to said one or more premise-based telephones;
   a plurality of cloud-based session border controller switches in communication with the local premise-based IP PBX exchange; and
   a plurality of cloud-based Internet service provider server, wherein each respective one of the plurality of cloud-based Internet service provider servers is associated with a corresponding one of the plurality of cloud-based session border controller switches and is configured to couple calls to public switched telephone networks; and
   a highest-quality routing protocol, activated or executed at the local premise-based IP PBX exchange,
   wherein the highest-quality routing protocol:
      detects a voice channel quality for each respective one of a plurality of voice channels between the local premise-based IP PBX exchange and the plurality of cloud-based Internet service provider servers, and
      routes a voice call to a particular one of the cloud-based Internet service provider servers via whichever one of the voice channels has a highest detected voice channel quality,
   wherein the local IP PBX exchange has a packet string generator for periodically generating packet strings and transmitting the packet strings to echo modules in the Internet service provider servers, wherein each of the Internet service provider servers has one of the echo modules and each of the each respective one of the echo modules is configured to echo any transmitted packets back to the local IP PBX exchange, and
   wherein the local IP PBX exchange has one or more detectors for detecting a number of lost packets and packet delay associated with each of the servers based on one or more of the transmitted and echoed packet strings and for generating a score reflective of said lost packets and packet delays.

2. The system of claim 1, wherein
   the lower the score, the lower the number of lost packets and the lower packet delays,
   said local IP PBX exchange including a comparator for comparing the scores associated with each of said servers and for routing voice calls from and to said premise-based telephones to that server having the lowest score, thereby to improve audio quality of the voice call.

3. The system of claim 2, and further including a load factor detector at said local IP PBX exchange for detecting the load at each of said servers and for adjusting the score of a server based on the load at said server.

4. The system of claim 3, wherein a load request is transmitted independently of said packet string.

5. The system of claim 4, wherein said load request is timed so as not to interfere with the transmission or receipt of said packet string.

6. The system of claim 2, wherein said local IP PBX exchange initiates said packet string every 20 to 40 seconds.

7. The system of claim 6, wherein said packet string is generated automatically and without regard to voice over IP calls processed by said local IP PBX exchange.

8. The system of claim 7, wherein once said local IP PBX exchange module is connected to a cloud-based server, the voice call stays connected to the selected server until the voice call is terminated.

9. The system of claim 7, wherein said packet string is transmitted utilizing a user datagram protocol.

10. The system of claim 1, wherein said savers include multiple remotely located servers in different geographic locations such that an outage of one saver does not affect the operation of other servers.

11. The system of claim 1, wherein the quality of said voice channel is determined by the number of lost packets and packet delay.

12. The system of claim 1, wherein the quality of said voice channel is determined by a history of lost packets and packet delays to introduce hysteresis.

13. The system of claim 1, wherein the highest-quality routing protocol at the local premise-based IP PBX exchange comprises routing protocol software that:
receives data representing lost packets, delayed packets, and load levels from the detector;
detects a voice channel quality between the local IP PBX exchange and each of the plurality of cloud-based Internet service provider servers;
selects a particular voice channel to one of the cloud-based Internet service provider servers based on the detected voice channel qualities; and
routes the voice call from one of the premises-based telephones via the particular voice channel to the cloud-based Internet service provider server.

14. A method for improving voice quality of a Voice over IP network in a system comprising one or more premise-based telephones; a local premise-based IP private branch exchange (PBX) exchange coupled to said one or more premise-based telephones; a plurality of cloud-based session border controller switches in communication with the local premise-based IP PBX exchange; and a plurality of cloud-based Internet service provider servers, wherein each respective one of the plurality of cloud-based Internet service provider servers is associated with a corresponding one of the plurality of cloud-based session border controller switches and is configured to couple calls to public switched telephone networks, the method comprising:
interposing a highest-quality routing protocol at the local premise-based IP PBX exchange,
detecting, with the highest-quality routing protocol, a quality of voice channel for each respective one of a plurality of voice channels between the local IP PBX exchange and the cloud-based Internet service provider servers;
routing a voice call to a particular one of the cloud-based Internet service provider server via whichever one of the voice channels that exhibits the highest voice call quality,
wherein detecting the quality of the voice channel comprises:
periodically transmitting packet string to form a packet string generator in the local premise-based IP PBX exchange to echo modules in the Internet service provider servers, wherein each one of the Internet service provider servers has one of the echo modules, and each echo module is configured to echo the transmitted packet strings back to the local premise-based IP PBX exchange; and
detecting, with one or more detectors in the local, premise-based IP PBX exchange, a number of lost packets and packet delay associated with each of the cloud-based Internet service provider servers based on one or more of the transmitted and echoed packet string and for generating a score reflective of said lost packets and packet delays.

15. The method of claim 14, wherein the highest voice quality saver connection is determined by detecting the lost packets and the packet delay between the local premise-based IP PBX exchange and each of the cloud-based Internet service provider servers.

16. The method of claim 14, wherein the highest voice quality server connection is determined by a history of lost packets and packet delay between the local IP PBX exchange and a server to introduce hysteresis.

17. The method of claim 14, wherein the highest voice quality server connection is additionally determined by the load on a server.

18. The method of claim 14, wherein highest voice quality is provided by probing of the Internet service provider servers with a packet string and reflecting the packet string as an echo back to the local IP PBX exchange.

19. The method of claim 18, wherein the local IP PBX exchange determines highest voice quality server connection based on the echo reflected back packet strings.

20. The method of claim 19, wherein highest voice quality is determined by the lost packets and packet delays associated with the echo reflected back packet strings.

21. The method of claim 20, wherein highest voice quality is determined by a history of the lost packets and packet delays.

22. The method of claim 20, wherein the highest voice quality is additionally determined by the load on a cloud-based Internet service provider server.

23. The method of claim 14, wherein the highest-quality routing protocol at the local premise-based IP PBX exchange comprises routing protocol software that:
receives data representing lost packets, delayed packets, and load levels from a measurement module;
detects a voice channel quality between the local IP PBX exchange and each of the plurality of cloud-based Internet service provider servers;
selects a particular voice channel to one of the cloud-based Internet service provider servers based on the detected voice channel qualities; and
routes the voice call from one of the premises-based telephones via the particular voice channel to the cloud-based Internet service provider server.

24. A system for connecting Voice over IP calls, the system comprising:
one or more premise-based telephones;
a local premise-based IP PBX exchange coupled to the one or more premise-based telephones, wherein the local premise-based IP PBX exchange comprises:
a measurement module;
a load probe; and
routing protocol software activated or executed on the local IP PBX exchange,
a plurality of cloud-based Internet service provider servers coupled to the local IP PBX exchange, wherein each respective one of the cloud-based Internet service provider servers in configured to couple calls to a public switched telephone network and has:
- an associated cloud-based session border controller switch in communication with the local premise-based IP PBX exchange; and
- an echo module;

wherein the local premise-based IP PBX exchange sends a packet string every 20 to 40 seconds to all of the session border controller switches, and wherein the packet strings are reflected by the echo modules back to the local premise-based IP PBX exchange, at which point the measurement module measures packet delay and packet loss, wherein the load probe of the local premise-based IP PBX exchange transmits probes to probe load levels on each of the plurality of cloud-based Internet service provider servers and reports back the load levels to the measurement module, wherein the local premise-based IP PBX exchange, utilizing the routing protocol software being activated or executed on the local premise-based IP PBX exchange:
- detects the quality of the voice channel between the local premise-based IP PBX exchange and each respective one of the plurality of cloud-based servers and routes a voice call to the particular one of the cloud-based servers that exhibits the highest voice call quality, wherein detecting the quality of the voice channel comprises:
- periodically transmitting packet strings to from a picket string generator in the local premise-based IP PBX exchange to echo modules in the Internet service provider servers, wherein each one of the Internet service provider servers has one of the echo modules, and each echo module is configured to echo the transmitted packet strings back to the local premise-based IP PBX exchange; and
- detecting, with one or more detectors in the local, premise-based IP PBX exchange, a number of lost packets and packet delay associated with each of the cloud-based Internet service provider servers based on one or more of the transmitted and echoed packet strings and for generating a sore reflective of said lost packets and packet delays.

25. The system of claim 24, wherein the local IP PBX exchange, utilizing the routing protocol software being activated or executed on the local IP PBX exchange:
- receives data representing the measured lost packets, delayed packets, and load levels from the measurement module;
- detects a voice channel quality between the local IP PBX exchange and each respective one of the plurality of cloud-based Internet service provider servers;
- selects a particular voice channel from the local IP PBX exchange to one of the cloud-based Internet service provider servers based on the detected voice channel qualities; and
- routes a voice call from one of the premises-based telephones via the particular voice channel to the cloud-based Internet service provider server.

* * * * *